United States Patent [19]

McEachern

[11] Patent Number: 4,620,749
[45] Date of Patent: Nov. 4, 1986

[54] DECORATIVE ATTACHMENTS FOR WHEELS

[75] Inventor: Robert L. McEachern, Vancouver, Canada

[73] Assignee: The Original Round Effects Company Limited, Vancouver, Canada

[21] Appl. No.: 799,706

[22] Filed: Nov. 19, 1985

[51] Int. Cl.⁴ .......................... B60B 7/00; B60R 13/00
[52] U.S. Cl. ................................. 301/37 SA; 428/31; 301/37 R; 301/37 H; 301/37 C
[58] Field of Search ........... 428/31; 301/37 SA, 37 R, 301/37 H, 37 C

[56] References Cited

U.S. PATENT DOCUMENTS 3,796,465 3/1974 Cordiak ........................... 428/31 X
3,987,409 10/1976 Freeman ......................... 301/37 SA Primary Examiner—Alexander S. Thomas
Attorney, Agent, or Firm—Robert F. Delbridge; Arne I. Fors

[57] ABSTRACT

A decorative attachment for a wheel includes a circular rod-like frame having a diameter slightly less than the diameter of the wheel rim, and a decorated flexible material extending across and secured to the frame. The material has a central aperture to receive the hub and a multitude of small apertures throughout the material providing a porosity of from about 30% to about 80% to enable transversely moving air to pass therethrough.

13 Claims, 4 Drawing Figures

U.S. Patent    Nov. 4, 1986    Sheet 2 of 2    4,620,749
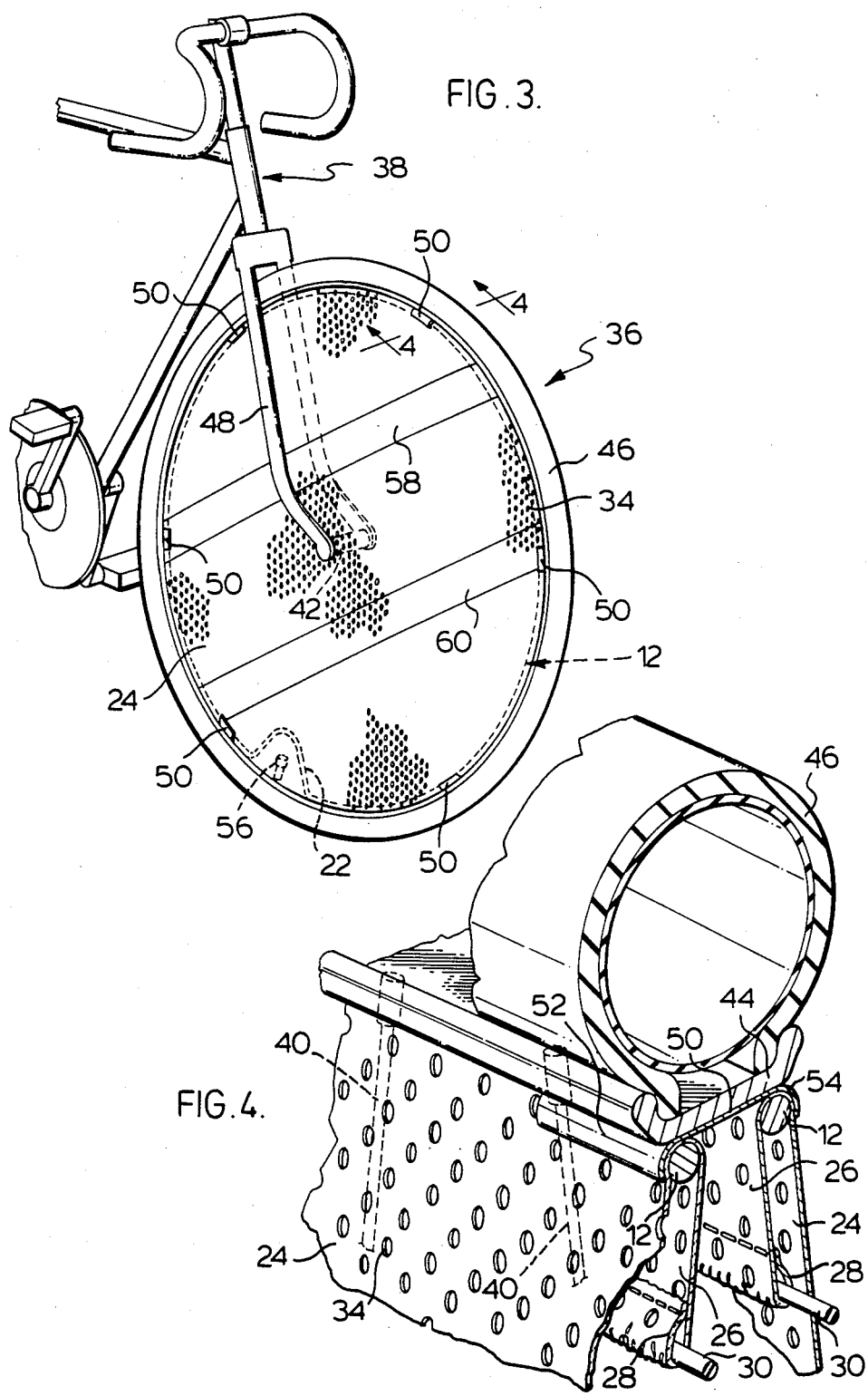

4,620,749

1

DECORATIVE ATTACHMENTS FOR WHEELS

This invention relates to decorative attachments for wheels with spokes, for example bicycle wheels. The term "decorative" in this application is intended to cover not only artistic decoration but also literary decoration, namely written decoration comprising one or more words, letters or numbers.

Various decorative attachments for spoked wheels have been proposed from time to time. However, such prior proposals have various disadvantages. It is therefore an object of the invention to provide an improved decorative attachment for spoked wheels such as bicycle wheels.

According to the invention, a decorative attachment comprises a circular rod-like frame having a diameter slightly less than the diameter of the wheel rim, and a decorated flexible material extending across and secured to the frame, the material having a central apperture to receive the wheel hub and a multitude of small appertures throughout the material providing a porosity of from about 30% to about 80% to enable transversely moving air to pass therethrough.

A pair of such decorative attachments can be located on opposite sides of a wheel with the hub passing through the central appertures in the flexible material, with there being a series of securing devices spaced around the periphery of the frames, each securing device extending through the wheel between the spokes and secured to the attachment frames on opposite sides of the wheel to secure the decorative attachments in assembly with the wheel.

The decorated flexible material, which may for example be synthetic plastic material, may carry any suitable form of decoration, for example a pattern or other visually attractive design and/or written information such as advertising.

Preferably, the decorated flexible material extends completely across the frame and is secured thereto continuously therearound. The flexible material may extend over the frame from a front side to a rear side, with the flexible material having a peripherally-extending hem on the rear side containing elastic means which retains the flexible material in assembly with the frame.

The circular rod-like frame may comprise a resiliently bendable rod with overlapping end portions, and adjustable fastening means fastening the end portions together and permitting the amount of overlap of the end portions to be adjusted to vary the diameter of the frame.

The porosity of the decorative flexible material may advantageously be in the range of from about 30 to about 65%, more preferably in the range of from about 45 to about 50%.

Each securing device may comprise a clip having bent opposite end portions each engaged over a respective frame of the decorative attachment.

A preferred embodiment of the invention will now be described, by way of example, with reference to the accompanying drawings, of which:

2

Figure 1:
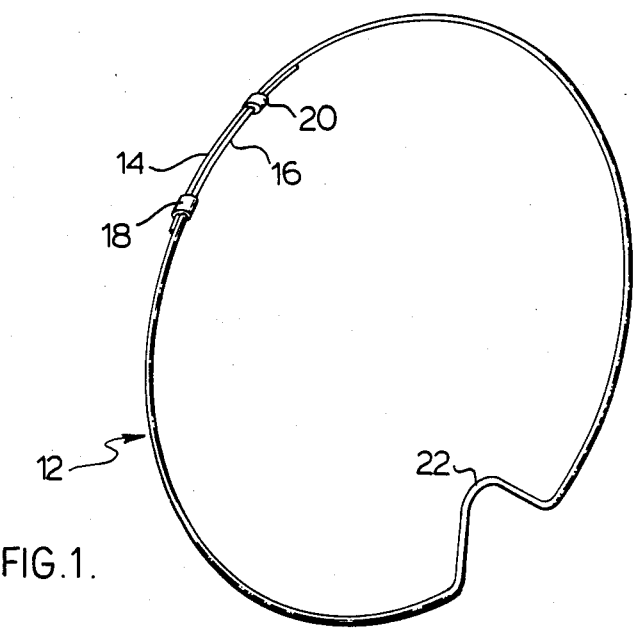
FIG. 1 is a perspective view of the frame of a decorative attachment.
Figure 2:
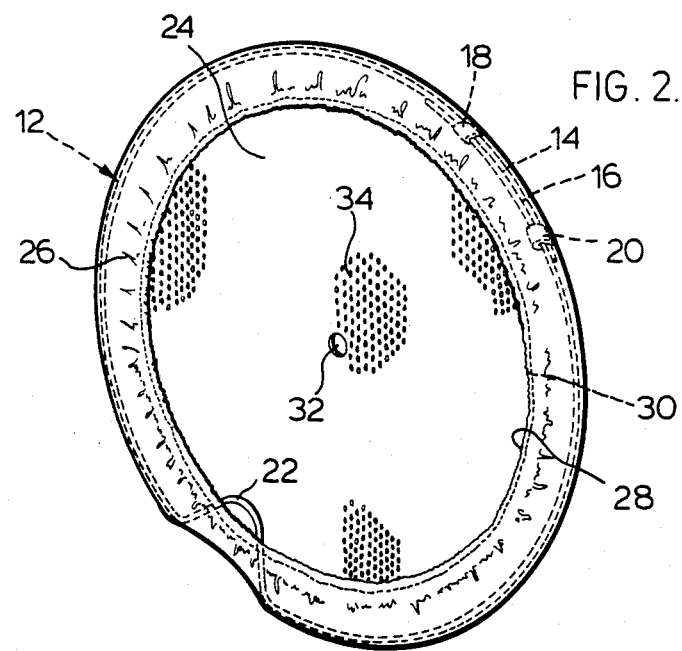
FIG. 2 is a similar view of a decorative attachment, namely the frame with decorated flexible material secured thereto.

FIG. 3 is a prospective view of the front part of a bicycle with decorative attachments secured to the front wheel, and FIG. 4 is a fragmentary prospective view taken generally along the line 4—4 of FIG. 3 showing the manner in which a pair of decorative attachments are secured on opposite sides of the wheel.

Refering to the drawings, each decorative attachment comprises a resilient wire frame 12 bent into a circular shape with overlapping end portions 14, 16 held together by clips 18, 20. The clips 18, 20 each comprise a short length of metal bent around the frame end portions 14, 16 to frictionally grip the end portions 14, 16 while at the same time permitting relative movement between the end portions 14, 16 upon the application of appropriate force to enable the diameter of the frame 12 to be varied. In this way, a single frame 12 can be adjusted in diameter to enable the frame to be attached to wheels of varying diameter within the predetermined range. One portion 22 of the frame 12 is inwardly bent for a purpose which will be mentioned later.

A circular sheet of flexible plastic material 24 extends completely across the front of the frame 12, and over the frame 12 so as to form an edge portion 26 on the rear side. Edge portion 26 has a sewn hem 28 containing a length of elastic material 30 extending around the edge portion 26 to retain the flexible material 24 on the frame 12. The flexible material 24 has a central apperture 32 and a multiplicity of small holes 34 extending throughout the material 24 so as to provide a porosity of from about 30 to about 80%.

A pair of decorative attachments are mounted on opposite sides of the front wheel 36 of a bicycle 38. The wheel 36 has spokes 40 radiating in known manner from a central hub 42 to a rim 44 carrying a tire 46. The wheel 36 can be removed from the front 48 of the bicycle 38 in known manner to enable the opposite ends of the hub 42 to be passed through the central appertures 32 in the flexible material 24, the decorative attachments of course being oriented so that the edge portions 26 are on the inside, with the major area of the decorative material 24 being on the outside. The decorative attachments are then secured in place on the wheel 36 by a series of clips 50 spaced around the frames 12. Each clip 50 comprises a short length of metal having bent ends 52, 54. Each clip 50 extends from one side of the wheel 36 to the other between the spokes 40, with one bent end 52 engaged over the frame 12 of one decorative attachment and the other bent end 54 engaged over the frame 12 of the other decorative attachment. The frames 12 are oriented relative to the wheel 36 so that the recessed portions 22 of the frames 12 are over the tire inflation valve 56 to permit ready access thereto.

The outer faces of the flexible material 24 of each attachment may be provided with any desired decoration, whether pictorial and/or written, for example the two stripes 58, 60 shown in FIG. 3 which give an interesting visual effect when the bicycle is ridden. As previously mentioned, the flexible material 24 has a porosity of from about 30 to about 80% provided by the small holes 34 located throughout the area of the material 24. This is to enable transversely flowing air to pass therethrough, thereby minimizing the effect of crosswinds on the wheel 36 with the decorative attachments secured thereto. If the porosity was less than about 30%, a crosswind may adversely effect the rider's balance to an undesirable extent. If the porosity was greater than about 30%, the area of the material 24 available for decoration would be undesirably reduced. Preferably, the porosity is in the range of from about 30 to about 65%, still more preferably in the range of from about 45 to about 50%.

It will therefore be readily appreciated that the invention provides effective decorative attachments for spoked wheels such as bicycle wheels which can readily be attached thereto. Other embodiments of the invention will be clearly apparent to a person skilled in the art, the scope of the invention being defined in the appended claims.

What I claim as new and desire to protect by Letters Patent of the United States is:

1. A decorative attachment for a wheel having spokes extending radially from a central hub to a tire-carrying rim, said attachment comprising a circular rod-like frame having a diameter slightly less than the diameter of the wheel rim, and a decorated flexible material extending across and secured to the frame, said material having a central aperture to receive the hub and a multitude of small appertures throughout the material providing a porosity of from about 30% to about 80% to enable transversely moving air to pass therethrough.

2. A decorative attachment according to claim 1 wherein the decorated flexible material extends completely across the frame and is secured thereto continuously therearound.

3. A decorative attachment according to claim 2 wherein the decorated flexible material extends over the frame from a front side to a rear side, the flexible material having a peripherally-extending hem on the rear side containing elastic means which retains the flexible material in assembly with the frame.

4. A decorative attachment according to claim 1 wherein the circular rod-like frame comprises a resiliently bendable rod with overlapping end portions, and adjustable fastening means fastening the end portions together and permitting the amount of overlap of the end portions to be adjusted to vary the diameter of the frame.

5. A decorative attachment according to claim 1 wherein the porosity of the flexible material is in the range of from about 30 to about 65%.

6. A decorative attachment according to claim 5 wherein the porosity of the flexible material is in the range of from about 45 to about 50%.

7. A decorated wheel assembly comprising a wheel having spokes radiating from a central hub to a tire-carrying rim, and a pair of decorative attachments on opposite sides of the wheel, each decorative attachment comprising a circular rod-like frame having a diameter slightly less than the diameter of the wheel rim, and a decorated flexible material extending across and secured to the frame, said flexible material having a central aperture and a multitude of small apertures throughout the material providing a porosity of from about 30% to about 80% to enable transversely moving air to pass therethrough, said decorative attachments being located on opposite sides of the wheel with the hub passing through the central appertures in the flexible material, said assembly also including a series of securing devices spaced around the periphery of a frame, each securing device extending through the wheel between the spokes and secured to the attachment frames on opposite sides of the wheel to secure the decorative attachments in assembly with the wheel.

8. A decorated wheel assembly according to claim 7 wherein the decorated flexible material extends completely across the frame of each decorative attachment and is secured to the frame continuously therearound.

9. A decorated wheel assembly according to claim 8 wherein the decorated flexible material extends over the frame of the respective attachment from a front side to a rear side, the flexible material having a peripherally-extending hem on the rear side containing elastic means which retains the flexible material in assembly with the frame.

10. A decorated wheel assembly according to claim 7 wherein the circular rod-like frame of each decorative attachment comprises a resiliently bendable rod with overlapping end portions, and adjustable fastening means fastening the end portions together to permit the amount of overlap of the end portions to be adjusted to vary the diameter of the frame.

11. A decorated wheel assembly according to claim 7 wherein the porosity of the material is in the range of from about 30 to about 65%.

12. A decorated wheel assembly according to claim 11 wherein the porosity of the material is from about 45 to about 50%.

13. A decorated wheel assembly according to claim 7 where each securing device comprises a clip having bent opposite end portions and engaged over the respective frame of the decorative attachments.

* * * * *